(12) United States Patent
Tian et al.

(10) Patent No.: US 11,387,675 B2
(45) Date of Patent: Jul. 12, 2022

(54) WIRELESS CHARGING ASSEMBLY AND PREPARATION METHOD THEREOF, TERMINAL DEVICE AND WIRELESS CHARGING METHOD THEREOF

(71) Applicants: BEIJING BOE DISPLAY TECHNOLOGY CO., LTD., Beijing (CN); BOE TECHNOLOGY GROUP CO., LTD., Beijing (CN)

(72) Inventors: Wenting Tian, Beijing (CN); Xiang Feng, Beijing (CN); Yalong Su, Beijing (CN); Yun Qiu, Beijing (CN); Xiao Sun, Beijing (CN); Sha Liu, Beijing (CN); Zhaokun Yang, Beijing (CN); Qiang Zhang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 534 days.

(21) Appl. No.: 16/465,345

(22) PCT Filed: Oct. 23, 2018

(86) PCT No.: PCT/CN2018/111466
§ 371 (c)(1),
(2) Date: May 30, 2019

(87) PCT Pub. No.: WO2019/196377
PCT Pub. Date: Oct. 17, 2019

(65) Prior Publication Data
US 2021/0099013 A1 Apr. 1, 2021

(30) Foreign Application Priority Data

Apr. 13, 2018 (CN) .......................... 201810336763.1

(51) Int. Cl.
*H02J 50/10* (2016.01)
*H02J 50/40* (2016.01)
(Continued)

(52) U.S. Cl.
CPC ............ *H02J 50/10* (2016.02); *G06F 3/0412* (2013.01); *G06F 3/0416* (2013.01);
(Continued)

(58) Field of Classification Search
USPC ........................................................ 320/108
See application file for complete search history.

(56) References Cited

U.S. PATENT DOCUMENTS

2014/0125278 A1   5/2014   Kim et al.
2016/0063485 A1*  3/2016   Tunnell ................ H02J 7/0042
                                                              705/41

(Continued)

FOREIGN PATENT DOCUMENTS

CN   102447309 A   5/2012
CN   206250195 U   6/2017
CN   108336833 A   7/2018

OTHER PUBLICATIONS

International Search Report and Written Opinion in corresponding International Patent Application No. PCT/CN2018/111466 dated Jan. 23, 2019. 14 pages. (English translation attached.).

*Primary Examiner* — Bryce M Aisaka
(74) *Attorney, Agent, or Firm* — Leason Ellis LLP

(57) ABSTRACT

A wireless charging assembly includes a substrate and a charging emission trace on the substrate. The wireless charging assembly further includes a touch structure on a side, which is away from the charging emission trace, of the substrate. A preparation method of the wireless charging assembly, a terminal device and a wireless charging method for the terminal device are also provided.

15 Claims, 8 Drawing Sheets

(51) Int. Cl.
    *G06F 3/044*     (2006.01)
    *G06F 3/041*     (2006.01)
    *H01F 38/14*     (2006.01)

(52) U.S. Cl.
    CPC ........... *G06F 3/0446* (2019.05); *H01F 38/14* (2013.01); *H02J 50/40* (2016.02)

(56) References Cited

U.S. PATENT DOCUMENTS

| | | | |
|---|---|---|---|
| 2018/0048192 A1* | 2/2018 | Alonso | H02J 5/00 |
| 2019/0190324 A1* | 6/2019 | Bossetti | H02J 50/12 |

* cited by examiner

WIRELESS CHARGING ASSEMBLY AND PREPARATION METHOD THEREOF, TERMINAL DEVICE AND WIRELESS CHARGING METHOD THEREOF

CROSS-REFERENCE TO RELATED PATENT APPLICATIONS

This application is a U.S. National Stage Application under 35 U.S.C. § 371 of International Patent Application No. PCT/CN2018/111466, filed Oct. 23, 2018, which claims the benefit of priority under 35 U.S.C. Section 119(e) of Chinese Patent Application number 201810336763.1 filed Apr. 13, 2018, both of which are incorporated by reference in their entireties.

TECHNICAL FIELD

At least one embodiment of the present disclosure relates to a wireless charging assembly and a preparation method thereof, a terminal device and a wireless charging method thereof.

BACKGROUND

In recent years, wireless charging technology has been applied in various electronic devices, and is popular with consumers for convenience. For example, some existing smart phone devices have built-in wireless charging receiving coils, and wireless charging can be conveniently realized by a matching wireless charging base.

SUMMARY

At least one embodiment of the present disclosure provides a wireless charging assembly, and the wireless charging assembly comprises: a substrate, a charging emission trace on the substrate; the wireless charging assembly further comprises: a touch structure on a side, which is away from the charging emission trace, of the substrate.

For example, the charging emission trace is directly manufactured on the substrate.

For example, the touch structure is directly manufactured on the substrate.

For example, the charging emission trace comprises two or more than two layers of sub-charging emission traces, and two adjacent layers of the sub-charging emission traces are not in contact with each other.

For example, the sub-charging emission traces in different layers do not completely overlap with each other.

For example, the wireless charging assembly further comprises a display panel; the touch structure is integrated in the display panel, the charging emission trace is at a side, which is away from a light emitting side, of the display panel, and the substrate serves as a substrate of the display panel.

For example, the wireless charging assembly further comprises a display panel; the touch structure is at a light emitting side of the display panel, the charging emission trace is at a side, which is away from the light emitting side, of the display panel, and the substrate serves as a substrate of the display panel.

For example, the touch structure is a self-capacitive touch structure or a mutual-capacitive touch structure.

For example, in a case where the touch structure is a self-capacitive touch structure, the touch structure comprises a plurality of electrode blocks arranged in an array.

For example, in a case where the touch structure is a mutual-capacitive touch structure, the touch structure comprises a plurality of first touch electrodes and a plurality of second touch electrodes; the first touch electrodes and the second touch electrodes are crossed with each other and insulated from each other.

At least one embodiment of the present disclosure further provides a terminal device comprising the wireless charging assembly mentioned above, and the terminal device further comprises a wireless charging management circuit and a touch driving circuit; the charging emission trace of the wireless charging assembly is connected with the wireless charging management circuit; the touch structure of the wireless charging assembly is connected with the touch driving circuit.

For example, the wireless charging management circuit is on a mainboard of the terminal device, and the charging emission trace is connected with the mainboard through a first FPC; the first FPC comprises a charging emission trace connection end and a first mainboard connection end, the charging emission trace connection end is connected with the charging emission trace, and the first mainboard connection end is connected with the mainboard.

For example, the wireless charging management circuit is on a first FPC; the first FPC comprises a charging emission trace connection end and a first mainboard connection end, the charging emission trace connection end is connected with the charging emission trace, and the first mainboard connection end is connected with the mainboard of the terminal device.

For example, the touch driving circuit is on the mainboard, and the touch structure is connected with the mainboard through a second FPC; the second FPC comprises a touch structure connection end and a second mainboard connection end, the touch structure connection end is connected with the touch structure, and the second mainboard connection end is connected with the mainboard.

For example, the touch driving circuit is on a second FPC; the second FPC comprises a touch structure connection end and a second mainboard connection end, the touch structure connection end is connected with the touch structure, and the second mainboard connection end is connected with the mainboard.

For example, the first FPC and the second FPC are a same FPC, and the same FPC comprises a charging emission wiring connection end, a touch structure connection end and a mainboard connection end; the first mainboard connection end and the second mainboard connection end are a same end.

For example, the terminal device is one of a notebook computer, a vehicle-mounted display device and a desktop personal computer (PC) touch pad.

For example, in a case where the terminal device is a notebook computer, the wireless charging assembly is in a touch region of the notebook computer.

At least one embodiment of the present disclosure further provides a preparation method of the wireless charging assembly according to claim 1, and the preparation method comprises: forming the charging emission trace on the substrate; forming the touch structure on the side, which is away from the charging emission trace, of the substrate.

For example, forming the charging emission trace on the substrate comprises: forming the charging emission trace directly on the substrate by a screen printing process.

For example, forming the charging emission trace on the substrate comprises: forming the charging emission trace directly on the substrate by a sputtering and photoetching process.

For example, the charging emission trace comprises two or more than two layers of sub-charging emission traces; two adjacent layers of the sub-charging emission traces are not in contact with each other, and the sub-charging emission traces in different layers do not completely overlap with each other.

At least one embodiment of the present disclosure further provides a wireless charging method for the terminal device mentioned above, and the wireless charging method comprises: determining whether a wireless charging connection between a device to be charged and the wireless charging assembly is detected, in a case where the wireless charging connection between the device to be charged and the wireless charging assembly is detected, sending a first control signal to the wireless charging management circuit to control the charging emission trace to charge the device to be charged; otherwise, sending a second control signal to the touch driving circuit to control the touch structure to carry out a touch detection.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and those skilled in the art can obtain other drawings without any inventive work according to these drawings.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Figure 1:
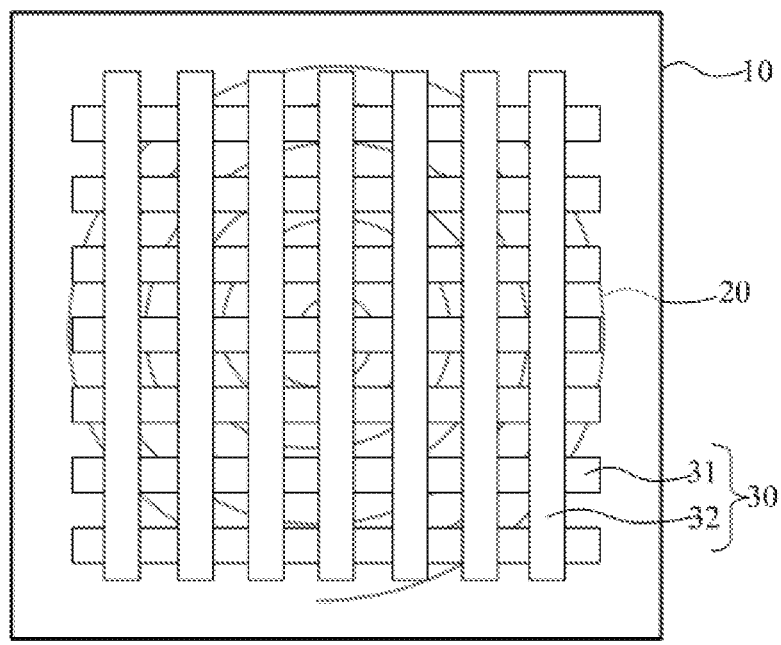
FIG. 1 is a schematic diagram of a wireless charging assembly provided by the present disclosure.
Figure 2A:
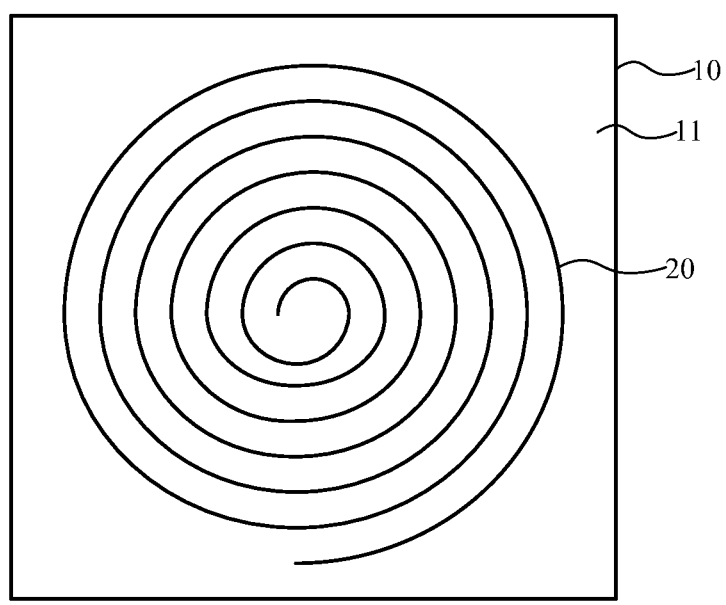
FIG. 2a is a structural schematic diagram of a charging emission trace on a back surface of the substrate as illustrated in FIG. 1.

At least one embodiment of the present disclosure provides a wireless charging assembly, as illustrated in FIG. 1 and FIG. 2a, the wireless charging assembly comprises a substrate 10 and a charging emission trace 20 on the substrate 10; as illustrated in FIG. 1 and FIG. 2a, the wireless charging assembly further comprises a touch structure 30 on a side, which is away from the charging emission trace 20, of the substrate 10.

It should be understood that a number of coils of the charging emission trace 20 is multiple, and a specific number of coils can be determined according to requirements of wireless charging.

An overall shape of the charging emission trace 20 can be determined according to requirements of different space shapes in practical applications, and for example, an overall structure of the charging emission trace 20 is a regular or irregular planar disk-shaped structure, not limited to regular shapes such as circles, squares and ellipses, so as to adapt to spaces of application occasions.

For example, the touch structure 30 is on a front surface 12 of the substrate 10, and the charging emission trace 20 is on a back surface 11 of the substrate 10; the front surface 12 and the back surface 11 are two surfaces opposite to each other. After the wireless charging assembly is applied to a terminal device, the front surface 12 of the substrate 10 is closer to an operation surface of the terminal device, so that influence caused by the charging emission trace 20 on a touch recognition of the touch structure 30 can be avoided.

As for the touch structure 30, those skilled in the art should understand that it can be any structure capable to perform a touch recognition, and no limitation is imposed to a specific structure thereof in the present disclosure.

At least one embodiment of the present disclosure provides a wireless charging assembly which realizes both a wireless charging function and a touch function by providing a charging emission trace 20 and a touch structure 30 respectively at two sides of the substrate 10.

Optionally, the charging emission trace 20 is directly manufactured on the substrate 10.

Those skilled in the art should understand that the charging emission trace 20 is directly manufactured on the substrate 10, that is, no extra fixing portion is needed for the charging emission trace 20 and the substrate 10, and when the charging emission trace 20 is manufactured on the substrate 10, the charging emission trace 20 is attached to the substrate 10.

Because the charging emission trace 20 is directly manufactured on the substrate 10, an accuracy and a uniformity of a manufacturing process of the charging emission trace 20 are high, and the wireless charging assembly is thinner and lighter; especially in a case where the touch structure 30 is also directly manufactured on the substrate 10, the wireless charging assembly is much thinner, lighter and integrated. In addition, compared with an existing case where a coil is formed by winding an enameled wire, the charging emission trace 20 provided by the present disclosure is directly manufactured on the substrate 10 and an adaptability to products is higher.

Considering that the charging emission trace 20 comprising only one layer may not satisfy a power specification required by some wireless charging, therefore, the charging emission trace 20 may comprise two or more than two layers of sub-charging emission traces, two adjacent layers of the sub-charging emission traces are not in contact with each other, and the sub-charging emission traces in different layers do not completely overlap with each other.

That is, in a direction perpendicular to the back surface of the substrate 10, the two or more than two layers of sub-charging emission traces are stacked, and a number of coils of each of the two or more than two layers of sub-charging emission traces is multiple.

For example, a charging power is increased by a plurality of layers of sub-charging emission traces, and the sub-charging emission traces in different layers do not completely overlap with each other.

Two adjacent layers of sub-charging emission traces are not in contact with each other, that is, for example, the two adjacent layers of sub-charging emission traces may be isolated by an insulation layer.

In at least one embodiment of the present disclosure, the charging emission trace 20 is made into a structure comprising a plurality of layers of sub-charging emission traces, two adjacent layers of sub-charging emission traces are not in contact with each other, and the sub-charging emission traces in different layers do not completely overlap with each other, so that a charging area is enlarged, and a charging efficiency is improved.

Optionally, the wireless charging assembly further comprises a display panel; the touch structure 30 is integrated in the display panel, the charging emission trace 20 is at a side, which is away from a light emitting side, of the display panel, and the substrate 10 bearing the charging emission trace 20 serves as a substrate of the display panel.

That is, for example, the charging emission trace 20 is directly manufactured on the back surface, which is away from the light emitting side of the display panel, of the substrate of the display panel integrated with the touch structure 30.

Figure 3:
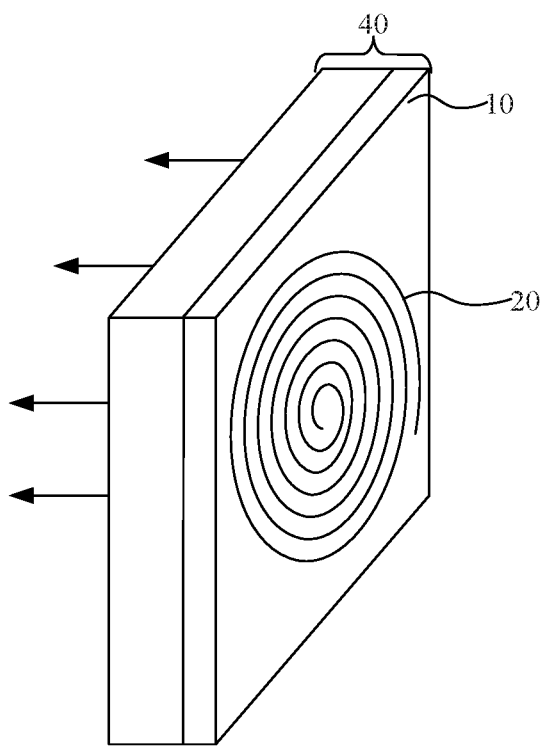
FIG. 3 is a schematic diagram of an arrangement of a display panel and a charging emission trace in a wireless charging assembly provided by the present disclosure.
Figure 4:
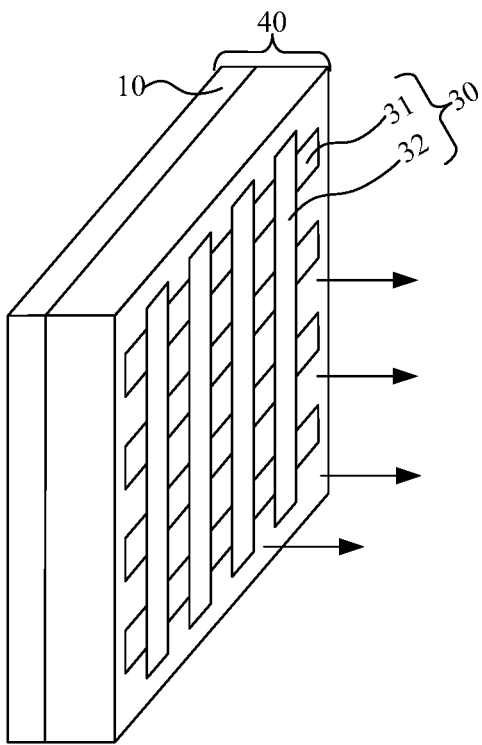
FIG. 4 is a schematic diagram of an arrangement of a display panel and a touch structure in a wireless charging assembly provided by the present disclosure.

Alternatively, as illustrated in FIG. 3 and FIG. 4, the wireless charging assembly further comprises a display panel 40; the touch structure 30 is at a light emitting side of the display panel 40 (illustrated by arrows in FIG. 3 and FIG. 4), the charging emission trace 20 is at a side, which is away from the light emitting side, of the display panel 40, and the substrate 10 bearing the charging emission trace 20 serves as a substrate of the display panel 40.

That is, as illustrated in FIG. 3, the charging emission trace 20 is directly manufactured on the back surface, which is away from the light emitting side of the display panel 40, of the substrate of the display panel 40. As illustrated in FIG. 4, the touch structure 30 is on the light emitting side of the display panel 40.

In at least one embodiment of the present disclosure, the display panel is arranged in the wireless charging assembly, so that the wireless charging assembly has a display function in addition to the touch function and the wireless charging function.

Based on the above description of the wireless charging assembly, considering that a current mainstream wireless charging technology is based on an electromagnetic induction type, capacitive touch allows the touch function and the wireless charging function to be basically unaffected by each other, and capacitive touch has advantages of high recognition accuracy, being supportive for multi-touch and the like, therefore, the touch structure 30 is preferably a capacitive touch structure. On this basis, the touch structure 30 is a self-capacitive touch structure or a mutual-capacitive touch structure.

Figure 5:
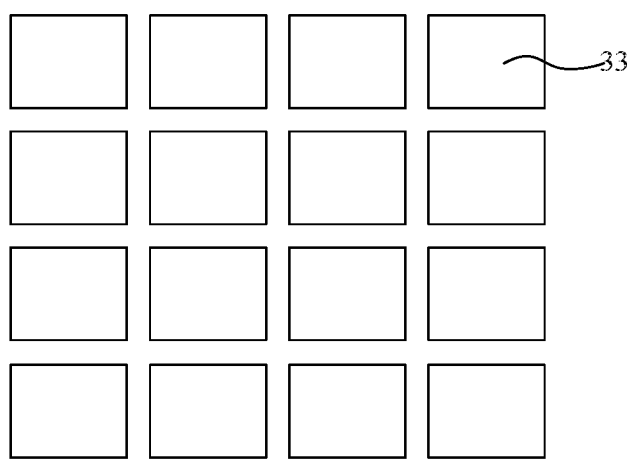
FIG. 5 is a schematic diagram of a self-capacitive touch structure provided by the present disclosure.

In a case where the touch structure 30 is a self-capacitive touch structure, as illustrated in FIG. 5, for example, the touch structure 30 comprises a plurality of electrode blocks 33 arranged in an array. A touch position is determined by detecting changes of capacitances on the electrode blocks 33.

For example, the electrode blocks 33 are formed of a transparent conductive material such as ITO (indium tin oxide), IZO (indium zinc oxide) etc.

Figure 2B:
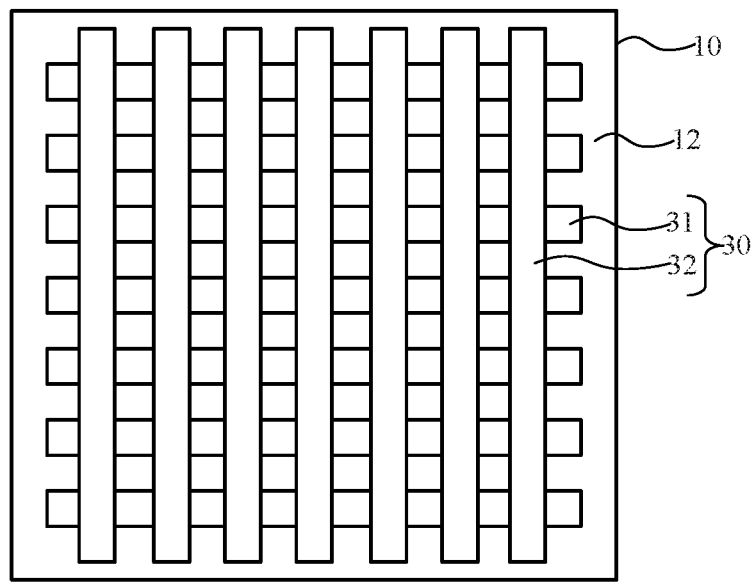
FIG. 2b is a structural schematic diagram of a touch structure on a front surface of the substrate illustrated in FIG. 1.

In a case where the touch structure 30 is a mutual-capacitive touch structure, as illustrated in FIG. 2b and FIG. 4, the touch structure 30 comprises a plurality of first touch electrodes 31 and a plurality of second touch electrodes 32; the first touch electrodes 31 and the second touch electrodes 32 are crossed with each other (for example, the first touch electrodes 31 are perpendicular to the second touch electrodes 32) and insulated from each other. When a touch driving signal is applied to the first touch electrodes 31, the touch position can be determined crosswise by detecting changes of capacitances on the second touch electrodes 32.

For example, the first touch electrodes 31 and the second touch electrodes 32 are made of transparent conductive materials such as ITO, IZO, etc.

At least one embodiment of the present disclosure further provides a terminal device, and the terminal device comprises the wireless charging assembly mentioned above. The terminal device further comprises a wireless charging management circuit and a touch driving circuit, the charging emission trace 20 of the wireless charging assembly is connected with the wireless charging management circuit, and the touch structure 30 of the wireless charging assembly is connected with the touch driving circuit.

The wireless charging management circuit can control the charging emission trace 20 of the wireless charging assembly so as to allow the wireless charging assembly to charge a device to be charged; the touch driving circuit can control the touch structure 30 in the wireless charging assembly, so as to allow the wireless charging assembly to recognize a touch of a user.

Figure 6:
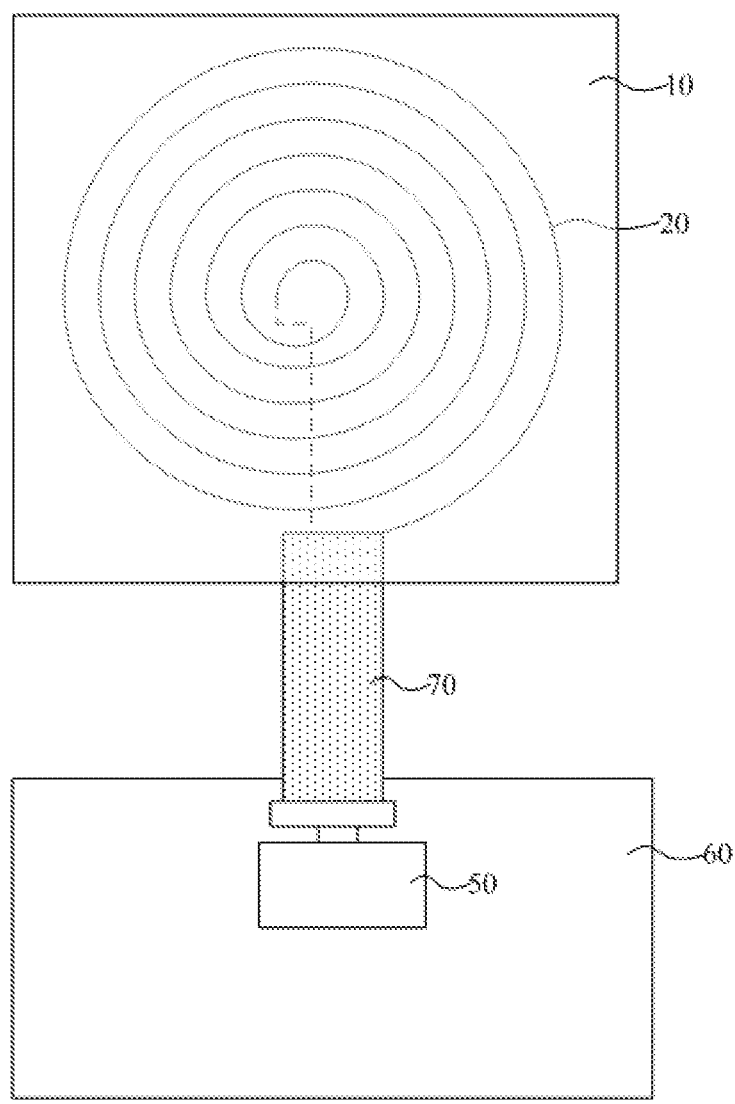
FIG. 6 is a first schematic diagram of a wireless charging emission trace, a wireless charging management circuit and a main board connected by a first FPC provided by the present disclosure.

Optionally, as illustrated in FIG. 6, the wireless charging management circuit 50 is on a mainboard 60, and the charging emission trace 20 is connected with the mainboard 60 through a first FPC (Flexible Printed Circuit) 70. For example, the first FPC 70 comprises a charging emission trace connection end and a first mainboard connection end, the charging emission trace connection end is connected with the charging emission trace 20, and the first mainboard connection end is connected with the mainboard 60.

Figure 7:
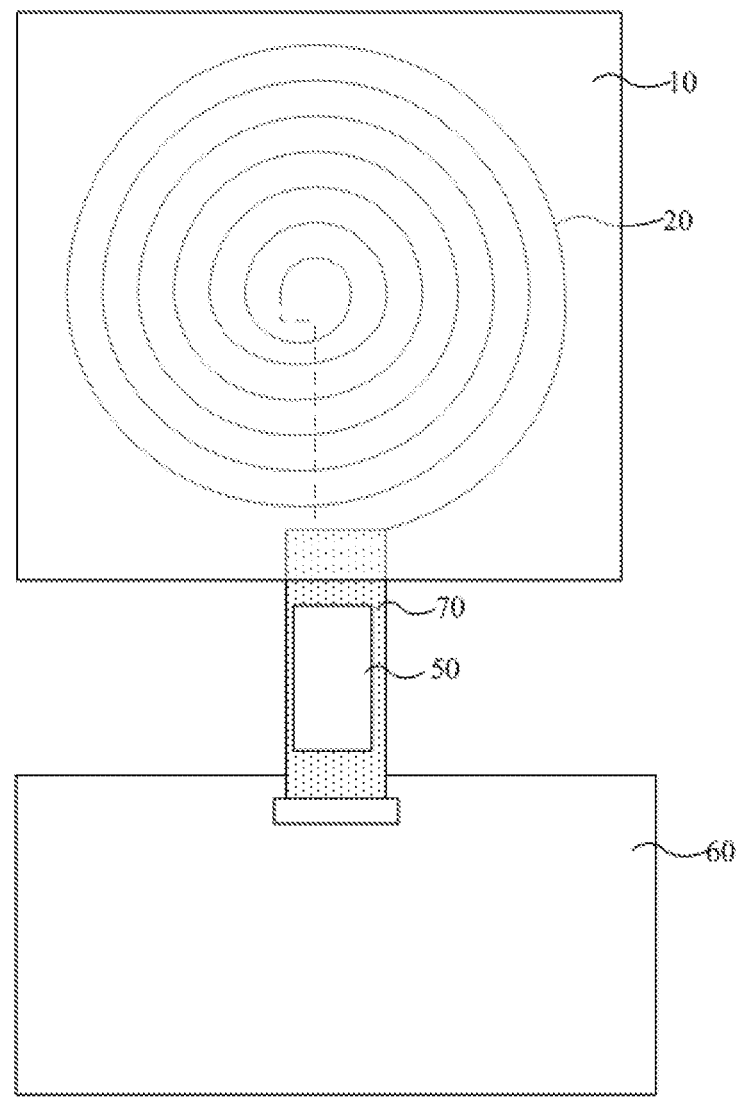
FIG. 7 is a second schematic diagram of a wireless charging emission trace, a wireless charging management circuit and a main board connected by a first FPC provided by the present disclosure.

Alternatively, as illustrated in FIG. 7, the wireless charging management circuit 50 is on a first FPC 70. The first FPC 70 comprises a charging emission trace connection end and a first mainboard connection end, the charging emission trace connection end is connected with the charging emission trace 20, and the first mainboard connection end is connected with the mainboard 60.

That is, through the first FPC 70, the charging emission trace 20 is connected with the wireless charging management circuit 50 and the wireless charging management circuit 50 is connected with the mainboard 60.

Figure 8:
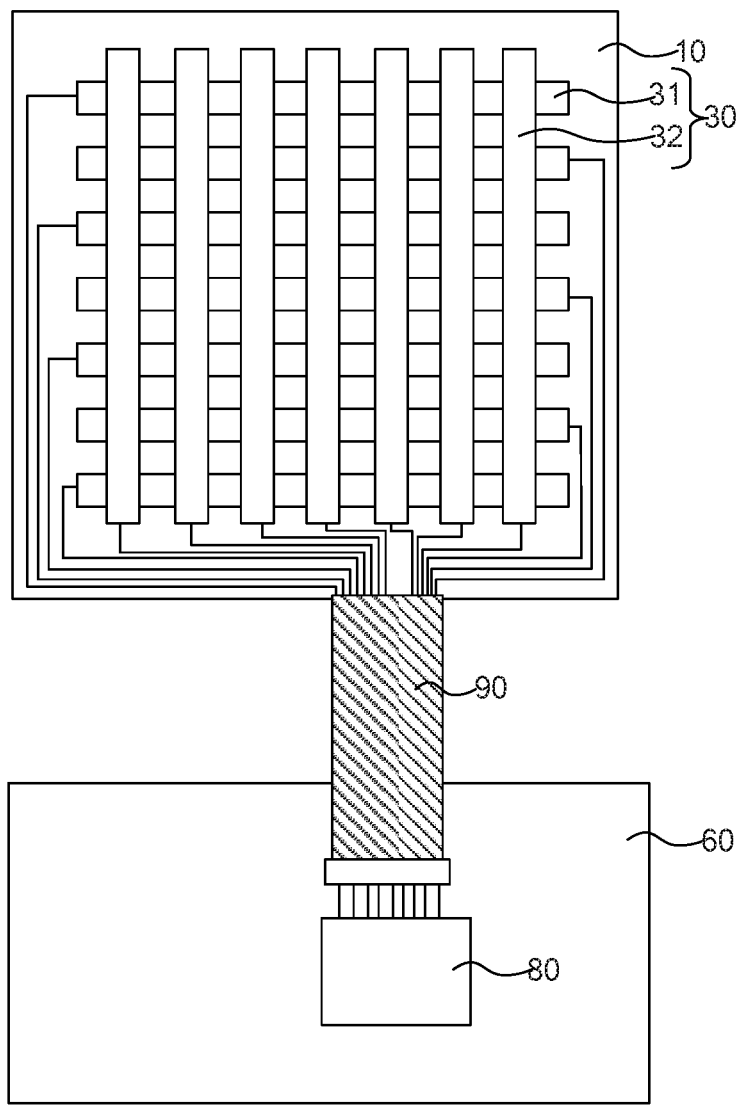
FIG. 8 is a first schematic diagram of a touch structure, a touch driving circuit and a main board connected by a second FPC provided by the present disclosure.

Optionally, as illustrated in FIG. 8, a touch driving circuit 80 is on the mainboard 60, and the touch structure 30 is connected with the mainboard 60 through a second FPC 90; the second FPC 90 comprises a touch structure connection end and a second mainboard connection end, the touch structure connection end is connected with the touch structure 30, and the second mainboard connection end is connected with the mainboard 60.

Figure 9:
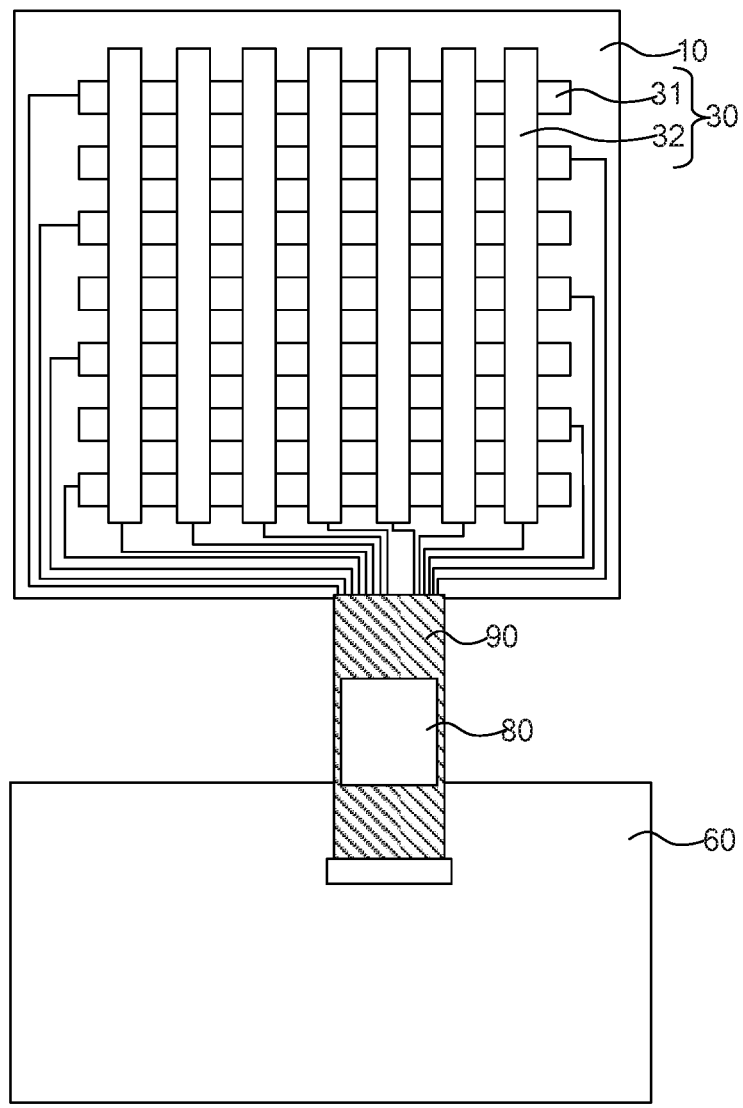
FIG. 9 is a second schematic diagram of a touch structure, a touch driving circuit and a main board connected by a second FPC provided by the present disclosure.

Alternatively, as illustrated in FIG. 9, the touch driving circuit 80 is on a second FPC 90. For example, the second FPC 90 comprises a touch structure connection end and a second mainboard connection end, the touch structure connection end is connected with the touch structure 30, and the second mainboard connection end is connected with the mainboard 60.

That is, through the second FPC 90, the touch structure 30 is connected to the touch driving circuit 80, and the touch driving circuit 80 is connected to the mainboard 60.

As a further alternative, the first FPC 70 and the second FPC 90 are a same FPC, and the same FPC comprises a charging emission wiring connection end, a touch structure connection end and a mainboard connection end. On this basis, the first mainboard connection end and the second mainboard connection end are a same end.

That is, in the case where the first FPC 70 and the second FPC 90 are the same FPC, the FPC is Y-shaped, two upper ends of the Y-shaped FPC are respectively the charging emission trace connection end and the touch structure connection end, and a lower end of the Y-shaped FPC is the mainboard connection end which serves as both the first mainboard connection end and the second mainboard connection end.

It should be noted that whether in an case of the first FPC 70 or the second FPC 90, or in a case where the first FPC 70 and the second FPC 90 are the same FPC, the mainboard connection end thereof and the mainboard 60 is connected through, for example, a BTB (board-to-board) interface.

Based on the above description of the terminal device, the terminal device may be any one of a notebook computer, a vehicle-mounted display device, and a desktop personal computer (PC) touch pad.

For example, in a case where the terminal device is a notebook computer, the wireless charging assembly is in a touch region of the notebook computer.

In a case where the terminal equipment is a notebook computer, on one hand, compared with an existing notebook computer, the touch control region of the notebook computer of the present disclosure can also be used as an emission end for wireless charging to wirelessly charge a mobile phone and the like, a wireless charging function is added to the touch region, and the touch region is a proper region in terms of size, material, use convenience and technology integration; on the other hand, because the notebook computer has mobility, it can wirelessly charge a mobile phone and the like outdoors, thus enriching application scenarios of the notebook computer.

Figure 10:
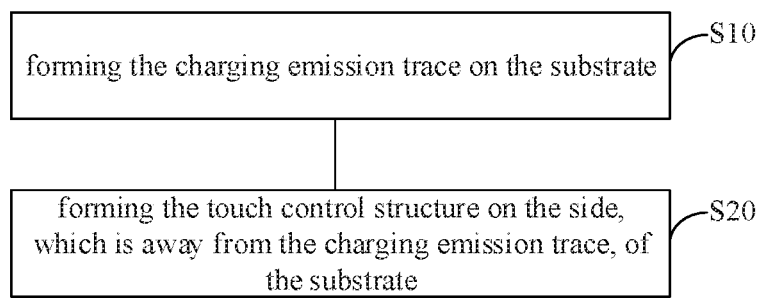
FIG. 10 is a flow diagram of a preparation method of a wireless charging assembly provided by the present disclosure.

At least an embodiment of the present disclosure further provides a preparation method of the wireless charging assembly. In order to make the description brief, a brief description is given below. Specific embodiments can be referred to the above-mentioned embodiments and examples of the wireless charging assembly. As illustrated in FIG. 10, the method comprises:

S10: forming the charging emission trace 20 on the substrate 10.

For example, a material of the charging emission trace 20 is a metal such as copper, silver, or the like.

In addition, it should be understood that the number of coils of the charging emission trace 20 is multiple, and a specific number of the coils can be determined according to wireless charging requirements.

An overall shape of the charging emission trace 20 can be determined according to requirements of different space shapes in practical applications, and for example, an overall structure of the charging emission trace 20 is a regular or irregular planar disk-shaped structure, not limited to regular shapes such as circles, squares and ellipses, so as to adapt to spaces of application occasions.

S20: forming the touch structure 30 on the side, which is away from the charging emission trace 20, of the substrate 10.

For example, the touch structure 30 is formed by a patterning process. The patterning process includes film formation, exposure, development, etching, etc.

The touch structure 30 can perform touch recognition, and no limitation is imposed to specific structures of the touch structure 30 in the present disclosure.

At least one embodiment of the present disclosure provides a preparation method of the wireless charging assembly which realizes both the wireless charging function and the touch function, by respectively manufacturing a charging emission trace 20 and a touch structure 30 on both sides of the substrate 10.

Optionally, S20 comprises: forming the charging emission trace 20 directly on the substrate 10 by a screen printing process.

Alternatively, S20 comprises: forming the charging emission trace directly on the substrate by a sputtering and photoetching process.

The charging emission trace 20 with a multiple number of coils, a high precision and an arbitrary shape can be formed by these two methods, and thus multiple application occasions are realized.

Because the charging emission trace 20 is directly manufactured on the substrate 10, an accuracy and a uniformity of a manufacturing process of the charging emission trace 20 are high, and the wireless charging assembly is thinner and lighter; especially in a case where the touch structure 30 is also directly manufactured on the substrate 10, the wireless charging assembly is much thinner, lighter and integrated. In addition, the charging emission trace 20 is directly manufactured on the substrate 10 and thus the wireless charging assembly has a higher adaptability to products.

Considering that the charging emission trace 20 comprising only one layer may not satisfy a power specification required by some wireless charging, therefore, the charging emission trace 20 may comprise two or more layers of sub-charging emission traces, two adjacent layers of the sub-charging emission traces are not in contact with each other, and the sub-charging emission traces in different layers do not completely overlap with each other.

For example, in a case where multi-layer charging emission traces 20 are formed by the screen printing process, sub charging emission traces in each layer are formed by one screen printing process.

In a case where the multi-layer charging emission traces 20 are formed by the sputtering and photolithography process, the sub-charging emission traces in each layer are formed by one sputtering and photolithography process.

In at least one embodiment of the present disclosure, the charging emission trace 20 is made into a structure comprising a plurality of layers of sub-charging emission traces, two adjacent layers of sub-charging emission traces are not in contact with each other, and the sub-charging emission traces in different layers do not completely overlap with each other, so that a charging area is enlarged, and a charging efficiency is improved.

Figure 11:
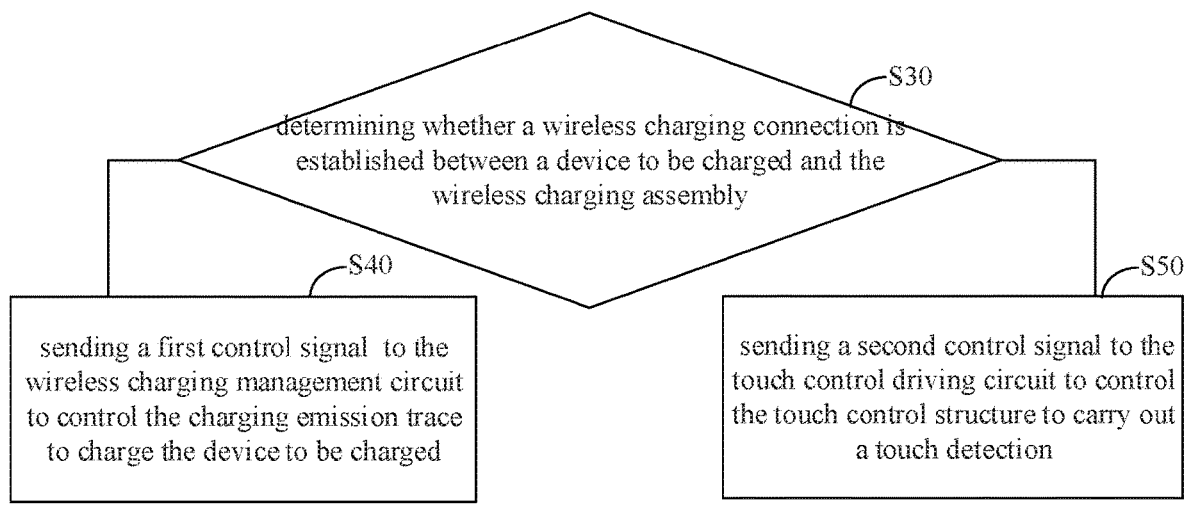
FIG. 11 is a flow diagram of a wireless charging method provided by the present disclosure.

At least one embodiment of the present disclosure further provides a wireless charging method for the terminal device mentioned above. In order to make the description brief, a brief description is given below. Specific embodiments can be referred to the above-mentioned terminal device. As illustrated in FIG. 11, the wireless charging method for the terminal device comprises:

S30: determining whether a wireless charging connection between a device to be charged and the wireless charging assembly is detected; in a case where the wireless charging connection between the device to be charged and the wireless charging assembly is detected, performing S40; otherwise, performing S50.

Because the wireless charging management circuit is connected with the charging emission trace 20, when the device to be charged is placed at a position corresponding to the charging emission trace 20 in the terminal device, a magnetic flux of the charging emission trace 20 changes. After a control module of the mainboard receives the change through the wireless charging management circuit, it is determined that a wireless charging connection is established between the device to be charged and the wireless charging assembly, otherwise, it is determined that no wireless charging connection is established between the device to be charged and the wireless charging assembly.

Of course, it is also possible to determine whether a wireless charging connection is established between the device to be charged and the wireless charging assembly by other means; for example, a sensor is provided and whether a wireless charging connection is established between the device to be charged and the wireless charging assembly is determined by the sensor.

S40: sending a first control signal to the wireless charging management circuit to control the charging emission trace 20 to charge the device to be charged.

S50: sending a second control signal to the touch driving circuit to control the touch structure 30 to carry out a touch detection.

Those skilled in the art should understand that all or a part of the steps for implementing the above method embodiments can be completed by hardware related to program instructions, the program related to the above-mentioned method can be stored in a computer readable storage medium, and when the program is executed, the steps including the method in the above-mentioned embodiments are performed; the above-mentioned storage medium includes ROM, RAM, magnetic disk or optical disk and other media capable of storing program codes.

The above description is only some specific embodiments of the present disclosure, but the scope of protection of the present disclosure is not limited thereto. Any changes or substitutions easily though of by a person familiar with the technical field within the technical scope of the present disclosure should be covered within the scope of protection of the present disclosure. Therefore, the scope of protection of the present disclosure should be based on the scope of protection of the claims.

The application claims priority to the Chinese patent application No. 201810336763.1, filed on Apr. 13, 2018, the entire disclosure of which is incorporated herein by reference as part of the present application.

What is claimed is:

1. A terminal device, comprising a wireless charging assembly, a wireless charging management circuit and a touch driving circuit,
   wherein the wireless charging assembly comprises a substrate, a charging emission trace on the substrate, and a touch structure on a side, which is away from the charging emission trace, of the substrate;
   the charging emission trace of the wireless charging assembly is connected with the wireless charging management circuit;
   the touch structure of the wireless charging assembly is connected with the touch driving circuit,
      wherein the terminal device further comprises a first flexible print circuit (FPC), and the wireless charging management circuit is on a mainboard of the terminal device or on the first flexible print circuit (FPC);
      the charging emission trace is connected with the mainboard through the first FPC; the first FPC comprises a charging emission trace connection end and a first mainboard connection end, the charging emission trace connection end is connected with the charging emission trace, and the first mainboard connection end is connected with the mainboard.

2. The terminal device according to claim 1, wherein the touch driving circuit is on the mainboard, and the touch structure is connected with the mainboard through a second FPC; the second FPC comprises a touch structure connection end and a second mainboard connection end, the touch structure connection end is connected with the touch structure, and the second mainboard connection end is connected with the mainboard.

3. The terminal device according to claim 2, wherein the first FPC and the second FPC are a same FPC, and the same FPC comprises a charging emission wiring connection end, a touch structure connection end and a mainboard connection end; the first mainboard connection end and the second mainboard connection end are a same end.

4. The terminal device according to claim 1, wherein the touch driving circuit is on a second FPC; the second FPC comprises a touch structure connection end and a second mainboard connection end, the touch structure connection end is connected with the touch structure, and the second mainboard connection end is connected with the mainboard.

5. The terminal device according to claim 1, wherein the terminal device is one of a notebook computer, a vehicle-mounted display device and a desktop personal computer (PC) touch pad.

6. The terminal device according to claim 5, wherein in a case where the terminal device is the notebook computer, the wireless charging assembly is in a touch region of the notebook computer.

7. The wireless charging assembly according to claim 1, wherein the charging emission trace is directly manufactured on the substrate.

8. The wireless charging assembly according to claim 1, wherein the touch structure is directly manufactured on the substrate.

9. The wireless charging assembly according to claim 1, wherein the charging emission trace comprises two or more than two layers of sub-charging emission traces, and two adjacent layers of the sub-charging emission traces are not in contact with each other.

10. The wireless charging assembly according to claim 9, wherein the sub-charging emission traces in different layers do not completely overlap with each other in a direction perpendicular to the substrate.

11. The wireless charging assembly according to claim 1, wherein the wireless charging assembly further comprises a display panel;

the touch structure is integrated in the display panel, the charging emission trace is at a side, which is away from a light emitting side, of the display panel, and the substrate serves as a substrate of the display panel.

12. The wireless charging assembly according to claim 1, wherein the wireless charging assembly further comprises a display panel;

the touch structure is at a light emitting side of the display panel, the charging emission trace is at a side, which is away from the light emitting side, of the display panel, and the substrate serves as a substrate of the display panel.

13. The wireless charging assembly according to claim 1, wherein the touch structure is a self-capacitive touch structure, and the touch structure comprises a plurality of electrode blocks arranged in an array.

14. The wireless charging assembly according to claim 1, wherein the touch structure is a mutual-capacitive touch structure, and the touch structure comprises a plurality of first touch electrodes and a plurality of second touch electrodes; the first touch electrodes and the second touch electrodes are crossed with each other in a direction perpendicular to the substrate and insulated from each other.

15. A wireless charging method for a terminal device, wherein the terminal device comprises a wireless charging assembly, a wireless charging management circuit and a touch driving circuit, and the wireless charging assembly comprises a substrate, a charging emission trace on the substrate, and a touch structure on a side, which is away from the charging emission trace, of the substrate; the charging emission trace of the wireless charging assembly is connected with the wireless charging management circuit; the touch structure of the wireless charging assembly is connected with the touch driving circuit;

the method comprises:

determining whether a wireless charging connection between a device to be charged and the wireless charging assembly is detected;

in a case where the wireless charging connection between the device to be charged and the wireless charging assembly is detected, sending a first control signal to the wireless charging management circuit to control the charging emission trace to charge the device to be charged;

otherwise, sending a second control signal to the touch driving circuit to control the touch structure to carry out a touch detection.

\* \* \* \* \*